United States Patent [19]

Rais

[11] 4,377,108
[45] Mar. 22, 1983

[54] COFFEE-MAKING MACHINE

[75] Inventor: Arnold Rais, Basel, Switzerland

[73] Assignee: M. Schaerer A.G., Berne, Switzerland

[21] Appl. No.: 266,932

[22] Filed: May 26, 1981

[51] Int. Cl.³ .............................................. A47J 31/60
[52] U.S. Cl. ..................................... 99/290; 100/127; 100/147
[58] Field of Search ................ 99/290, 289 R, 289 P, 99/289 D; 100/116, 127, 147

[56] References Cited

U.S. PATENT DOCUMENTS

| | | | |
|---|---|---|---|
| 1,135,309 | 4/1915 | Meakin | 100/127 |
| 2,517,073 | 8/1950 | Alvarez. | |
| 3,168,033 | 2/1965 | Hansen | 100/127 |
| 3,807,294 | 4/1974 | Ligh | 100/127 |
| 3,980,014 | 9/1976 | McEwen | 100/127 |
| 4,260,488 | 4/1981 | Condolios | 100/147 |

FOREIGN PATENT DOCUMENTS 367301 3/1963 Switzerland.

Primary Examiner—Robert W. Jenkins
Attorney, Agent, or Firm—Pearne, Gordon, Sessions, McCoy & Granger

[57] ABSTRACT

A device for separating coffee grounds from rinse water is disposed beneath a drain pipe of the coffee-making machine. This device comprises a tubular jacket having on the top side thereof an inlet opening for admitting rinse water containing coffee grounds. Detachably connected to one end of the jacket is a funnel-shaped, resilient end piece having a small aperture. On the underside of the jacket is a slot in which a strainer is inserted, through which rinse water but not coffee grounds can flow out of the jacket. Within the jacket there is a piston slidingly driven by a drive piston for pressing rinse water out of the coffee grounds. In order for the coffee grounds to leave the jacket, sufficient pressure must be exerted on the grounds to press part of them through the thus widened aperture in the resilient end piece. By separating the coffee grounds from the rinse water, the device keeps the grounds out of the sewer system.

1 Claim, 1 Drawing Figure

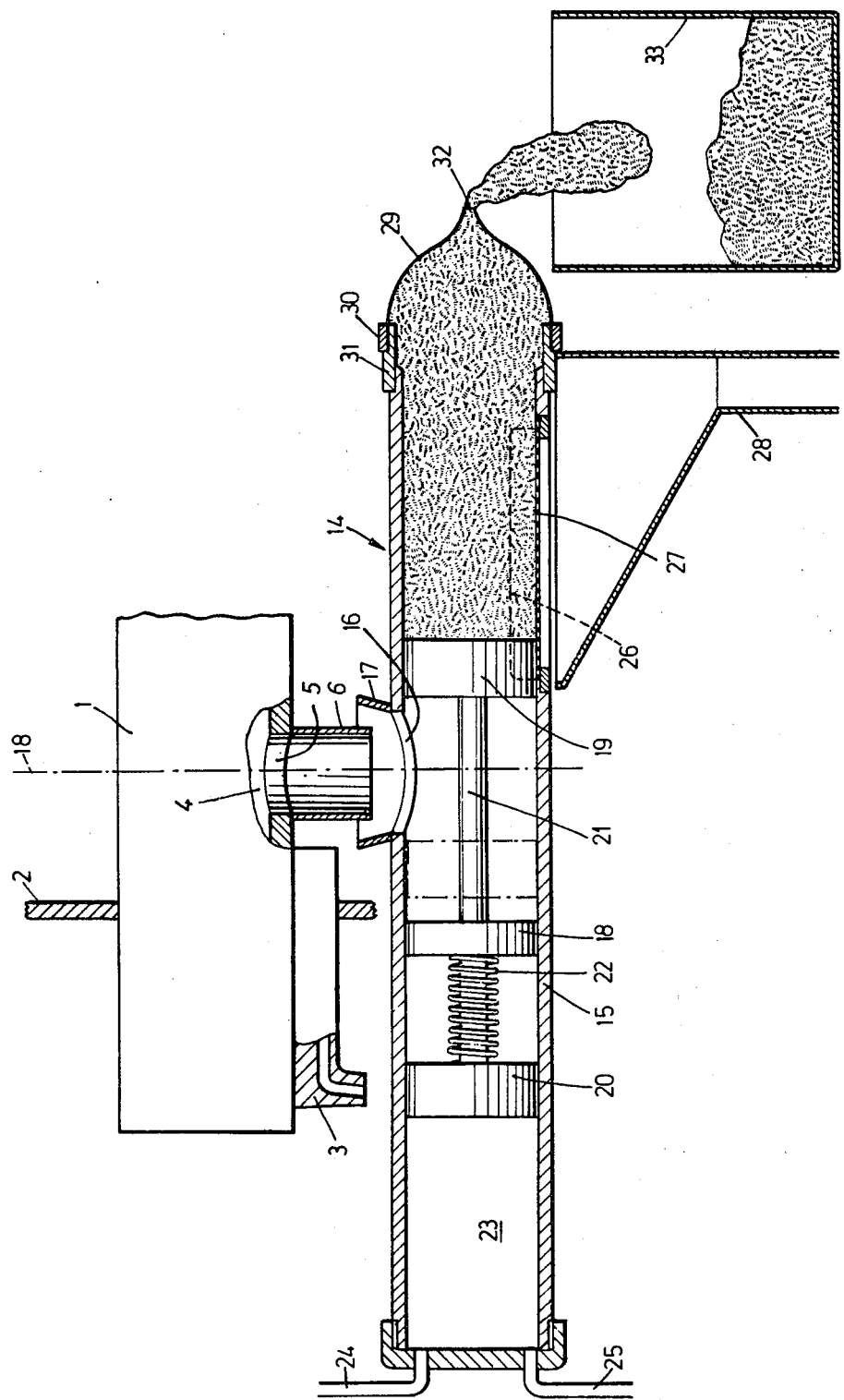

COFFEE-MAKING MACHINE

This invention relates to coffee-making machines, and more particularly to a coffee-making machine of the type having a drain pipe for evacuating rinse water containing coffee grounds.

In prior art coffee-making machines, the used coffee grounds remaining in the brewing chamber are rinsed out with water after the brewing operation. The mixture of rinse water and coffee grounds leaves the machine through a drain pipe leading to the sewage lines. A coffee-making machine of this type is described in Swiss Pat. No. 367,301, for example.

It is an object of this invention to provide an improved coffee-making machine which lessens the burden on the sewer system.

To this end, in the coffee-making machine according to the present invention, the improvement comprises means for separating the coffee grounds from the rinse water, including a tubular jacket having an upper inlet opening for admitting the mixture of liquid and solids, a plurality of openings in a lower region of the jacket substantially opposite the inlet opening and forming a first outlet for evacuating the rinse water, an end piece disposed at the end of the jacket adjacent to the bottom openings and having an outlet aperture of smaller cross-section than the jacket for evacuating the coffee grounds, which are largely rid of rinse water, a piston disposed in the jacket and movable in the longitudinal direction thereof over a distance at least equal to the size of the inlet opening, and drive means for moving the piston.

A preferred embodiment of the invention will now be described in detail with reference to the drawing, which is a sectional view of part of a coffee-making machine having means for separating the rinse water from the coffee grounds.

In the upper part of the drawing, part of a hydraulic cylinder 1 of the coffee-making machine is shown partially in section. Cylinder 1 extends through a face plate 2 and contains a sliding brewing piston (not shown).

The brewed coffee is withdrawn from cylinder 1 through an outlet 3, and the used coffee grounds leave a rinsing compartment 4 together with the rinse water through an opening 5 to which a drain pipe 6 is connected.

The brewing piston disposed in cylinder 1 may be driven by any suitable means such as a hydraulic drive cylinder, a worm-gear spindle, or a rack.

Beneath drain pipe 6 there is a device 14 for separating the coffee grounds from the rinse water. It should be specifically noted in this connection that the longitudinal axes of cylinder 1 and device 14 are not parallel to one another, as shown in the drawing for the sake of simplicity, but are actually at right angles, i.e., device 14 is to be thought of as rotated through 90° about the dot-dash line 18 shown in the drawing, so that the longitudinal axis of device 14 is perpendicular to that of cylinder 1 and parallel to face plate 2.

Device 14 comprises a tubular jacket 15 having an inlet opening 16 situated beneath drain pipe 6 and surrounded by a collar 17 into which drain pipe 6 slightly projects.

The interior of jacket 15 is divided by a stationary partition 18 into a left-hand compartment and a right-hand compartment, as viewed in the drawing. Disposed in the right-hand compartment is a piston 19 slidable from a rest position, shown in dot-dash lines, into a working position as shown in the drawing in solid lines. Piston 19 is driven by a working piston 20 slidingly disposed in the left-hand compartment of jacket 15 and connected to piston 19 by a piston rod 21 passing through partition 18 and, between the latter and working piston 20, through a coil spring 22. When no pressure fluid is supplied to a working space 23 through a feed pipe 24, and when a discharge line 25 is open, coil spring 22 presses working piston 20 and thus piston 19 into the rest position. When pressure fluid is supplied to space 23 through pipe 24 while discharge line 25 is closed, working piston 20 and hence piston 19 are pushed into the working position shown in the drawing, spring 22 then being compressed.

Piston 19 may be moved to and fro between the rest position and the working position by a threaded spindle, crank gear, or rack instead of by working piston 20.

At the bottom of the right-hand compartment of jacket 15 there is a first outlet for evacuating the rinse water, this outlet taking the form of a slot 26 in which a strainer 27 or a perforated plate is disposed. Instead of slot 26, there may simply be a plurality of small holes made directly in the respective region of jacket 15. The rinse water, but not the coffee grounds, can pass through strainer 27 or through the aforementioned plurality of small holes into a drain pipe 28 situated beneath slot 26. The rinse water thus separated from the coffee grounds flows through pipe 28 into the sewer system.

Attached to the end of jacket 15 adjacent to slot 26 is a funnel-shaped end piece 29. The edge of the larger opening of funnel part 29 is clamped by a ring 30 to a pipe piece 31 having an internal thread matching an external thread on jacket 15, so that end piece 29 can easily be unscrewed from jacket 15.

The smaller aperture 32 at the tapered extremity of end piece 29 forms a second outlet of device 14 for evacuating the coffee grounds separated from the rinse water. A waste bin 33 for receiving these coffee grounds is positioned under aperture 32.

Although end piece 29 may be of metal, it is preferably made of a resilient material such as chloroprene rubber or vulcanized natural rubber.

The mode of operation of device 14 as described above is as follows: when piston 19 is in the rest position shown in dot-dash lines, the mixture of rinse water and coffee grounds flows through drain pipe 6 and inlet opening 16 into the right-hand compartment of jacket 15. Part of the rinse water immediately flows out through strainer 27 into drain pipe 28, the coffee grounds being retained in the right-hand compartment of jacket 15. Upon completion of the rinsing operation, piston 19 is moved to the right, as viewed in the drawing, into the illustrated working position. Coffee grounds from previous rinsing operations are already contained in the part of jacket 15 situated between piston 19 and end piece 29.

Since the coffee grounds cannot pass through strainer 27 and since they are hindered in leaving jacket 15 by end piece 29 with its small aperture 32, the coffee grounds situated between piston 19 and end piece 29 are compressed so that the remaining rinse water is squeezed out through strainer 27. When the pressure exerted on the coffee grounds by piston 19 becomes sufficient to overcome the resistance produced by end piece 29, some of the coffee grounds are forced out through the expanding small aperture 32 of the resilient end piece 29. This portion of the grounds then drops into waste bin 33. It will be seen that the coffee grounds collected in waste bin 33 are largely rid of rinse water.

By means of the device described above, the coffee grounds are kept out of the sewer system, substantially rid of water, and saved until collected for further processing, e.g., as cattle feed.

The length of piston 19, i.e., the dimension measured along the path of its sliding movement, may be greater than the size of inlet opening 16 measured in the same direction, so that when piston 19 is in the working position, it closes opening 16 and thus prevents any rinse water or coffee grounds from getting in between piston 19 and partition 18.

Although inlet opening 16 and slot 26 at the bottom of jacket 15 are shown as diagonally opposite one another in the drawing, a modification of the embodiment is possible wherein slot 26 extends to beneath inlet opening 16 so that part of the rinse water drains off more quickly through strainer 27. Slot 26 covered by strainer 27 might also be replaced by a plurality of small holes extending all the way around jacket 15 in the region between inlet opening 16 and end piece 19, or this region of the jacket might be made of a sieve sheet. This would make it possible for the rinse water to exit along the entire circumference of the jacket in this region.

If the means for driving piston 19 are designed so that this piston reciprocates periodically, if the length of piston 19 is such that in its working position it closes inlet opening 16, and if collar 17 is high enough to store the mixture of rinse water and coffee grounds still flowing out while inlet opening 16 is thus closed, device 14 can also be utilized for a continuous-flow operation.

Exit aperture 32 of end piece 29 may also be in the form of a slit. Such an aperture is obtained if the funnel-shaped end piece 29 is replaced by a piece of resilient tubing having its free end pinched together by a resilient clip so that only a small slit remains as the exit aperture. As the pressure increases within the jacket, the slit becomes wider, so that the coffee grounds can be expelled intermittently.

What is claimed is:

1. A coffee-making machine of the type having a drain pipe for evacuating rinse water containing coffee grounds, wherein the improvement is a means for separating the coffee grounds from the rinse water comprising:

a tubular jacket disposed substantially horizontally, an inlet opening in the uppermost part of said jacket for admitting rinse water containing coffee grounds, means defining a longitudinal slot in a lowermost region of said jacket situated substantially opposite said inlet opening and forming an outlet for evacuating rinse water, and strainer means covering said slot, a detachable end piece formed of resilient material attached to the end of said jacket nearest said slot and having an outlet aperture of smaller cross-section than said jacket for evacuating coffee grounds, a piston disposed in said jacket and slidable axially therein over a distance at least equal to the dimension of said inlet opening measured along the longitudinal axis of said jacket between a retracted position spaced rearwardly from said inlet opening on the side away from said outlet aperture to define with said tubular jacket an expanded chamber communicating with said inlet opening to receive a charge of rinse water containing coffee grounds and an extended position spaced forwardly from said inlet opening on the side toward said outlet aperture to close said inlet opening and define a constricted chamber wherein said coffee grounds are squeezed to expel waste water therefrom and to force coffee grounds through said outlet aperture, and a hydraulic drive cylinder for moving said piston.

* * * * *